United States Patent [19]

Curry

[11] 4,162,082
[45] Jul. 24, 1979

[54] SELF-STEERING DOLLY

[75] Inventor: Norman R. Curry, Mississauga, Canada

[73] Assignee: Auto Steering Trailers Limited, Oakville, Canada

[21] Appl. No.: 924,296

[22] Filed: Jul. 13, 1978

[51] Int. Cl.² .............................................. B62D 53/00
[52] U.S. Cl. .................................. 280/81 A; 280/408; 280/423 A
[58] Field of Search ................ 280/423 R, 423 A, 426, 280/443, 81 A, 86, 103, 408, 476 R, 81 R, 446 R, 446 A, 446 B, 460 R, 80 R, 410

[56] References Cited

U.S. PATENT DOCUMENTS

| 2,731,276 | 1/1956 | Cross | 280/423 R |
|---|---|---|---|
| 2,812,193 | 11/1957 | Grace | 280/423 R |
| 2,919,928 | 1/1960 | Hoffer | 280/81 |
| 2,982,563 | 5/1961 | Gregg | 280/81 |
| 3,066,953 | 12/1962 | Chosy | 280/418 |
| 3,112,935 | 12/1963 | Gregg | 280/81 |
| 3,151,880 | 10/1964 | Black | 280/408 |
| 3,393,922 | 7/1968 | Adams | 280/423 |
| 3,827,723 | 8/1974 | Neff | 280/476 R |
| 3,870,340 | 3/1975 | Winter | 280/415 B |
| 4,076,264 | 2/1978 | Chatterley | 280/81 A |

Primary Examiner—Joseph F. Peters, Jr.
Assistant Examiner—R. Schrecengost
Attorney, Agent, or Firm—Hirons, Rogers & Scott

[57] ABSTRACT

The invention provides a self-steering dolly that is rigidly releasably connected to the rear of a forward vehicle, such as a tractor-trailer combination, and supports the front end of a towed rearward vehicle, such as a second or "pup" trailer so that the vehicles are in tandem. The wheels of the dolly are mounted on respective king pins; are connected by a linkage and are urged to the neutral or straight-ahead position by a centering device. The means for releasably connecting the dolly and the forward vehicle comprise two transversely extending headed pins on the dolly of the kind employed with a fifth wheel connection engageable in respective releasable spring latches on the frame of the forward vehicle.

5 Claims, 7 Drawing Figures

SELF-STEERING DOLLY

FIELD OF THE INVENTION

This invention is concerned with improvements in and relating to transport dollies of the kind employed for releasable tandem connecting of a rearward vehicle to a forward vehicle.

REVIEW OF THE PRIOR ART

The tandem connection together of two vehicles, particularly a tractor and two semi-trailers, is of continuing commercial interest, owing to the cost savings that are possible, and accordingly there have been a substantial number of prior proposals disclosing different equipment for this purpose. Despite the number of such proposals that have been made relatively few tandem rigs are in use at this time. A fundamental problem has been the apparent need hitherto to accept either a certain amount of instability in the tandem connection, or else a considerable amount of tire wear with the forward wheels of the rearward vehicle. Thus, it is found that if the dolly is rigidly connected to the frame of the forward trailer, so as to form in effect an extension thereof, the rear trailer being mounted on the dolly by a fifth wheel, then the above-mentioned high tire wear is obtained. If the dolly is connected to the forward trailer so as to pivot about a vertical axis the tire wear is reduced, but the presence of two closely-spaced vertical pivots between the two trailers introduces an undesirable instability that has been known to result in the vehicles overturning.

DEFINITION OF THE INVENTION

It is therefore an object of the invention to provide a new transport dolly for releasable tandem connection of two vehicles.

It is a more specific object to provide such a dolly which will provide a stable connection between the two vehicles and yet will minimize the amount of tire wear with the dolly wheels.

In accordance with the present invention there is provided a transport dolly for releasable tandem connection of a rearward vehicle to a forward vehicle comprising:

a dolly frame;

means at the forward end of the dolly frame for releasably rigidly connecting the dolly frame to the frame of the forward vehicle by which the dolly and the rearward vehicle are to be towed;

a fifth wheel connection mounted on the dolly frame to releasably receive the front end of the rearward vehicle;

a dolly axle;

a spring suspension connected to the dolly frame and the dolly axle and mounting the dolly axle to the dolly frame;

two stub axles mounted by king pins on the dolly axle at respective ends thereof for steering pivoting movement about respective king pin axes;

two road wheels mounted respectively by the stub axles and on which the dolly runs;

link means connecting the stub axles for simultaneous pivoting steering movement about their respective axes under the effect of sideways-directed forces applied to the road wheels by movement of the forward vehicle as it is steered away from a straight line; and centering means connected between the link means and the dolly frame and urging the road wheels to a centered straight ahead attitude.

The said releasably rigidly connecting means may include a pair of spaced pins mounted on the respective sides of the dolly frame to extend coaxially transversely therefrom, and respective releasable locking means mounted on respective spaced frame members of the forward vehicle frame so that each locking means receives a respective pin and thereby locks the dolly frame to the forward vehicle frame.

The said centering means may comprise a first cam member in said link means and movable transversely with the link means with said steering movement of the stub axles, a second cam member engagable with the first cam member, the two cam members cooperating to urge the first cam member to a transverse position corresponding to said centered straight ahead attitude of the road wheels, and motor means urging the second cam member into camming engagement with the first cam member.

DESCRIPTION OF THE DRAWINGS

A self-steering dolly which is a particular preferred embodiment of the invention will now be described, by way of example, with reference to the accompanying diagrammatic drawings, wherein.

DESCRIPTION OF THE PREFERRED EMBODIMENTS

Figure 1:
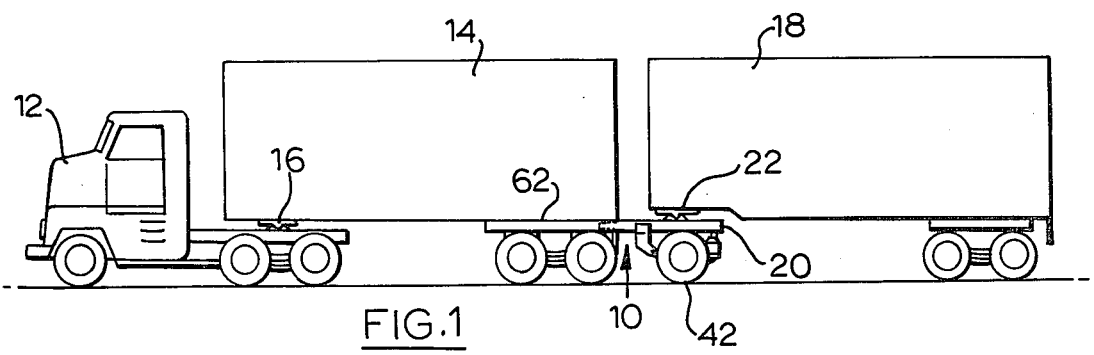
FIG. 1 is a side elevation showing a tractor and two trailer combination employing the dolly of the invention between the two trailers.
Figure 2:
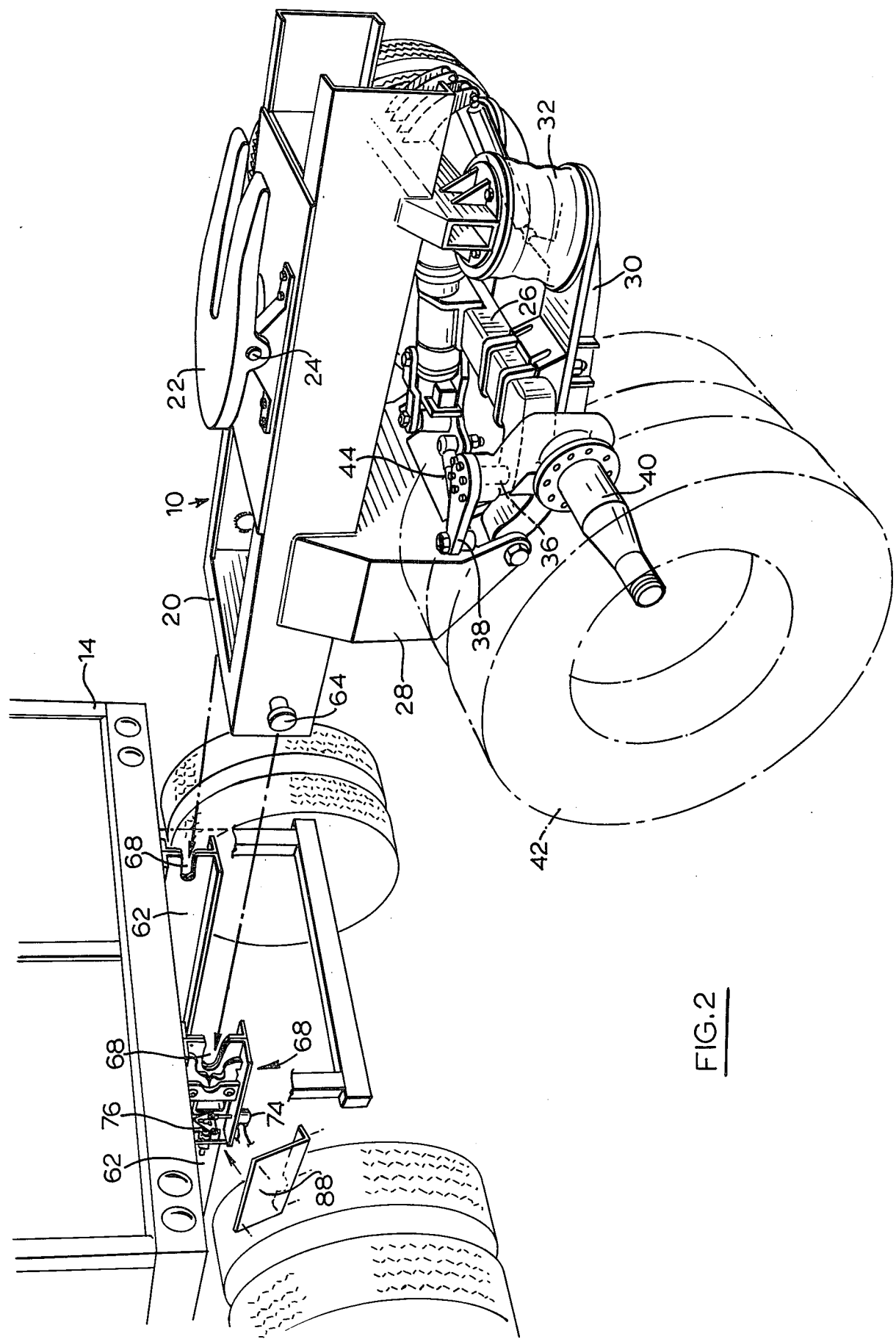
FIG. 2 is an exploded perspective view of the rear end of the forward trailer and the dolly, parts being shown broken away and in phantom as necessary for clarity of illustration.

FIG. 1 illustrates a typical application of a transport dolly 10 of the invention wherein a tractor 12 has a forward trailer 14 coupled thereto via a fifth wheel 16, and a rear trailer 18 is coupled to the forward trailer via the dolly. Referring now more specifically to FIG. 2 the dolly consists of a short rigid rectangular frame 20 having a fifth wheel connecting plate 22 mounted on its upper surface about horizontal pivots 24. A transverse axle 26 is mounted beneath the frame by any conventional suspension system, which in this embodiment is illustrated as consisting of downward-extending hangers 28 (FIG. 2), trailing links 30 to which the axle 28 is clamped, and air springs 32 and shock absorbers 34 interposed between the ends of the links 30 and the frame 20. However in other embodiments other types of suspension can be used without affecting the essential elements of the invention.

Figure 3:
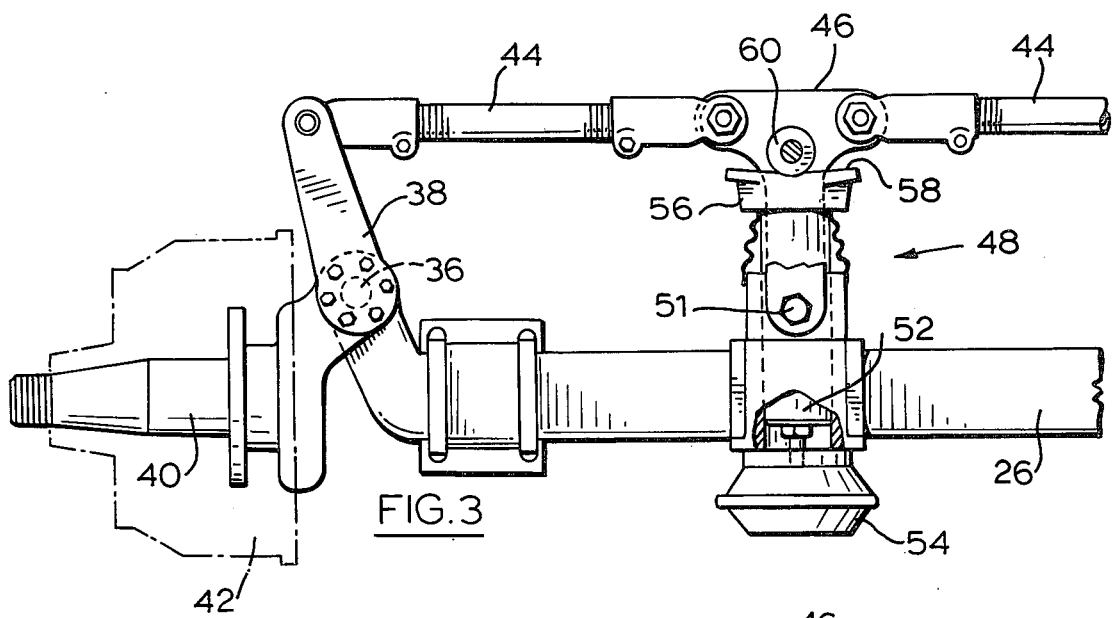
FIG. 3 is a plan view from above of a centralising device employed with the dolly, the device being shown in its "centered" or "straight-ahead" position.
Figure 4:
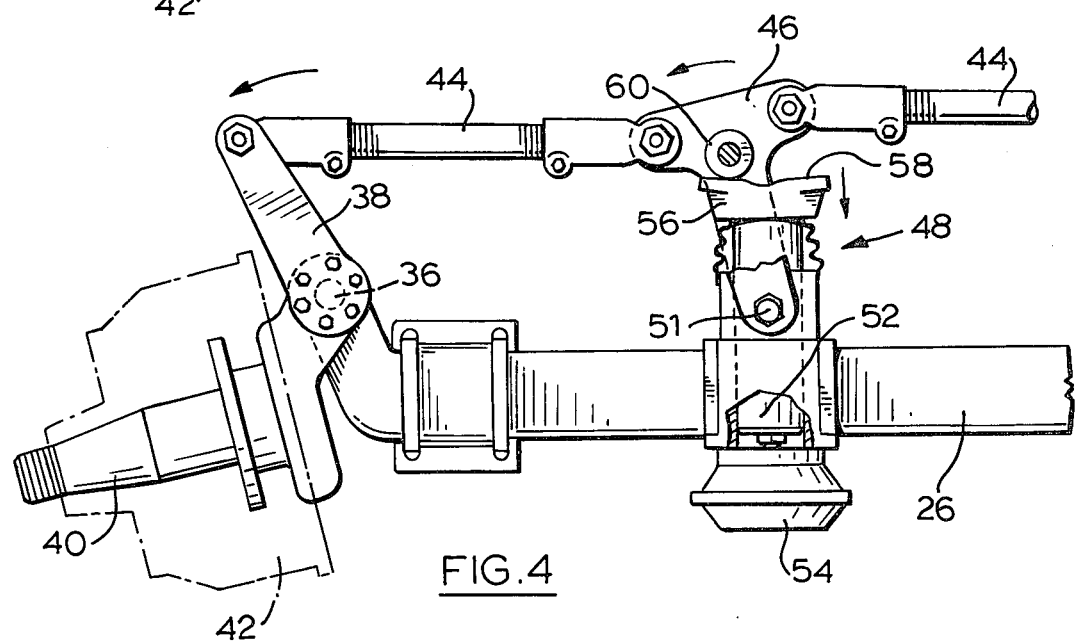
FIG. 4 is a view similar to FIG. 3 and showing the centralising device in an "off-center" position.

Referring now also to FIGS. 3 and 4 the axle 26 carries at its ends king pins 36 mounting links 38 for pivoting movement about respective substantially vertical pivot axes. Each link carries on one arm a respective stub axle 40 by which the respective road wheel 42 is mounted for steering movement. The two forwardly-projecting arms of the links 38 are connected together by link means so as to connect the stub axles for simultaneous steering movement, such link means consisting of an adjustable-length steering link 44 divided into two separate link sections, each pivoted at one end to the respective link 38 and at the other end to a central T-shaped link member 46 constituting part of centering means 48 for the steerable dolly axle. The centering device also consists of a body 50 rigidly fastened to the axle 26, having the link member 46 pivoted thereto at 51 about a vertical axis, and having a longitudinally-extending bore therein in which a rod member 52 moves and is urged forwardly in the direction of movement of the dolly by a constantly operating pneumatic diaphragm-type motor 54 fastened to the body rear end. The forward end of the rod member 52 carries a transverse cam member 56 having a cam element constituted by a concave or re-entrant forward cam surface 58 thereon, which is engaged by another cam element constituted by a cam roller 60 on the link 46. The centering device will therefore maintain the wheels 40 and their associated steering linkage in the "straight-ahead" position or attitude, as illustrated by FIG. 3, until the wheels are subjected to a force with a sideways-directed component of greater than a predetermined magnitude, as determined by the force applied by the motor 54 and the cam characteristics of cam surface 58, as the dolly is steered away from a straight line around a curve, so that the wheels will steer around the curve, assuming for example the attitude illustrated by FIG. 4, with consequent reduction in sideways scrubbing of the wheels and wear of their tires. However, as soon as the sideways-directed force reduces below the said predetermined value the wheels are quickly returned by the urging of the centering device to the neutral straight-ahead position for normal straight running.

It is important that the dolly can be quickly and easily connected to and disconnected from the frame 62 of the forward trailer, so that it runs rigidly with the forward trailer and without substantial transverse movement that would cause instability, and to this end the dolly frame 20 is provided with two coaxial transversely-outwardly extending headed pins 64 of the type that are used for connecting a trailer to its fifth wheel. The two channel side members of the frame 20 can slide endwise into the corresponding channel frame members of the forward trailer frame with the pins 64 entering respective horizontal slots 66 to engage respective independently operable locking devices 68.

Figure 5:
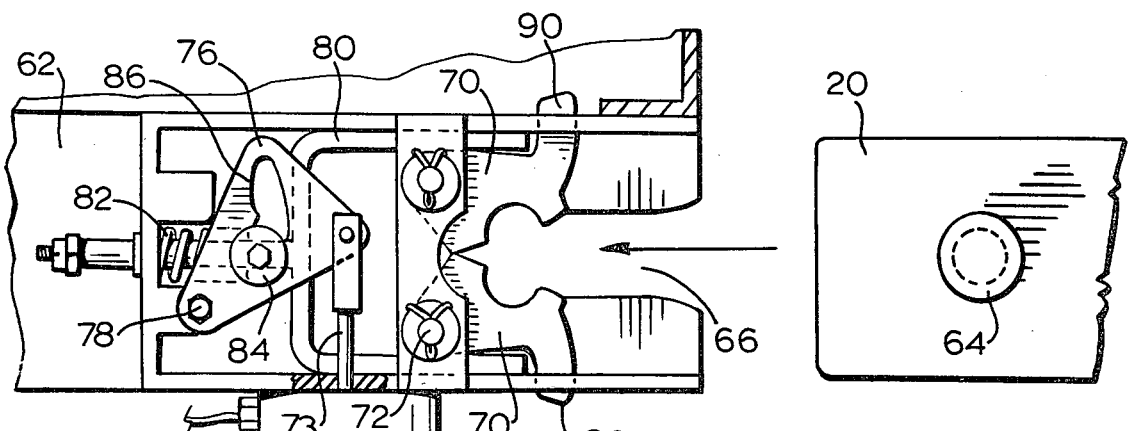
FIG. 5 is a side elevation of connecting means for connecting the dolly to the forward trailer, the dolly being in position for connection and the connecting means cover plate being removed to show the mechanism.
Figure 6:
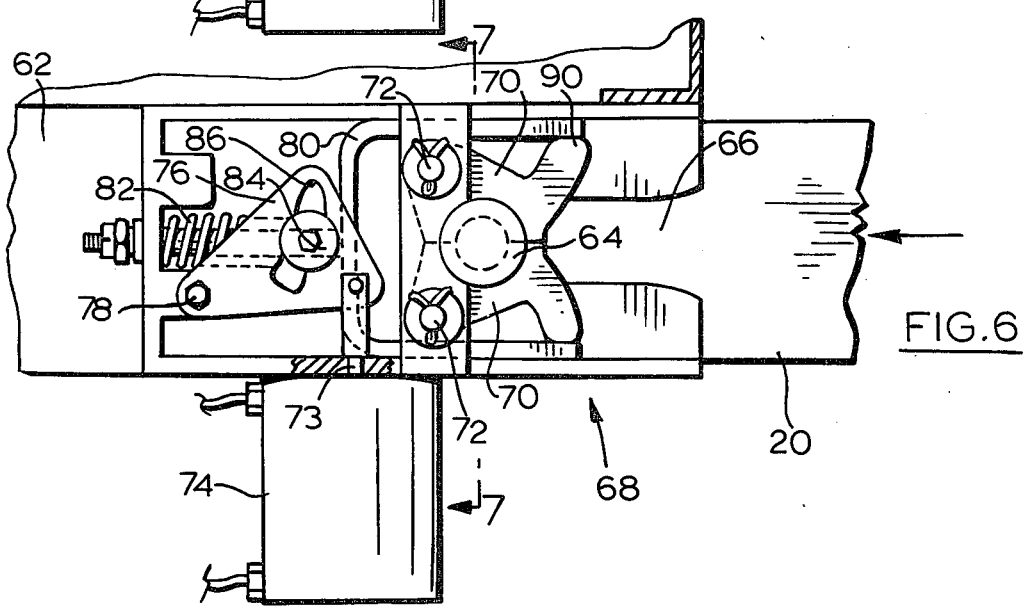
FIG. 6 is a view similar to FIG. 5 showing the dolly connected to the forward trailer.
Figure 7:
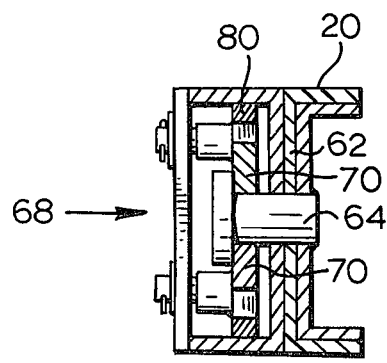
FIG. 7 is a section taken on the line 7—7 of FIG. 6.

Each device consists of a pair of jaws 70 pivoted at 72 about respective horizontal axes and adapted to embrace and close around the respective pin 64 as it enters the slot 66, as illustrated by FIG. 5. With the pins fully home as shown in FIG. 6 a piston 73 of a pneumatic motor 74 is moved downward, the rod being connected by pivot pin 75 to a cam 76 which is movable about a pivot 78, so that a yoke 80 is moved rearward under the action of a compression spring 82 between the yoke and the locking device frame and the action of a cam pin 84 moving in a cam slot 86 in the cam. In its full rearward position the arms of the yoke embrace ears 90 of the jaws 70 and lock them closed until the rod 74 is pushed upward upon actuation of the motor 74 by an operator to release the pins and permit uncoupling of the dolly. Each locking device is provided with a removable cover 88 (FIG. 2).

I claim:

1. A transport dolly for releasable tandem connection of a rearward vehicle to a forward vehicle comprising:
   a dolly frame;
   means at the forward end of the dolly frame for releasably rigidly connecting the dolly frame to the frame of the forward vehicle by which the dolly and the rearward vehicle are to be towed;
   a fifth wheel connection mounted on the dolly frame to releasably receive the front end of the rearward vehicle;
   a dolly axle;
   a spring suspension connected to the dolly frame and the dolly axle and mounting the dolly axle to the dolly frame;
   two stub axles mounted by king pins on the dolly axle at respective ends thereof for steering pivoting movement about respective king pin axes;
   two road wheels mounted respectively by the stub axles and on which the dolly runs;
   link means connecting the stub axles for simultaneous pivoting steering movement about their respective axes under the effect of sideways-directed forces applied to the road wheels by movement of the forward vehicle as it is steered away from a straight line; and
   centering means connected between the link means and the dolly frame and urging the road wheels to a centered straight ahead attitude.

2. A transport dolly as claimed in claim 1, wherein the said releasably rigidly connecting-means include a pair of spaced pins mounted on the respective sides of the dolly frame to extend coaxially transversely therefrom, and respective releasable locking means mounted on respective spaced frame members of the forward vehicle frame so that each locking means receives a respective pin and thereby locks the dolly frame to the forward vehicle frame.

3. A transport dolly as claimed in claim 1, wherein the said releasably rigidly connecting-means include a pair of spaced headed pins mounted on the respective sides of the dolly frame to extend coaxially transversely therefrom, and respective independently operable releasable jaw locking means mounted on respective spaced frame members of the forward vehicle frame, each locking means including a pair of jaws adapted to embrace the shaft of the respective headed pins with engagement of the pin shaft between the jaws, and means for releasably locking the jaws in retaining embracing engagement around the pin shaft.

4. A transport dolly as claimed in claim 1, wherein said centering means comprise a first cam member in said link means and movable transversely with the link means with said steering movement of the stub axles, a second cam member engagable with the first cam member, the two cam members cooperating to urge the first cam member to a transverse position corresponding to said centered straight ahead attitude of the road wheels, and motor means urging the second cam member into camming engagement with the first cam member.

5. A transport dolly as claimed in claim 4, wherein said centering means comprise a body mounted on said axle, the said first cam member comprises a link member pivoted to the said body for movement transverse to the direction of movement of the vehicle, having the steering link means pivotally connected thereto and carrying a first cam element, said second cam member comprises a rod member mounted by the body for movement parallel to the direction of movement of the vehicle and carrying a second cam element cooperating with the first cam element, and said motor means is carried by the body and engages the rod member to urge the second cam element into cam engagement with the first cam element.

* * * * *